United States Patent
Choi

(10) Patent No.: US 12,284,442 B2
(45) Date of Patent: Apr. 22, 2025

(54) MULTI-IMAGE STABILIZATION DEVICE AND CAMERA APPARATUS, AND MULTI-IMAGE STABILIZATION METHOD

(71) Applicant: SAMSUNG ELECTRO-MECHANICS CO., LTD., Suwon-si (KR)

(72) Inventor: Chul Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 254 days.

(21) Appl. No.: 17/862,113

(22) Filed: Jul. 11, 2022

(65) Prior Publication Data

US 2023/0051763 A1 Feb. 16, 2023

(30) Foreign Application Priority Data

Aug. 13, 2021 (KR) .................. 10-2021-0107437
Apr. 11, 2022 (KR) .................. 10-2022-0044524

(51) Int. Cl.
*H04N 23/68* (2023.01)
*G02B 27/64* (2006.01)
(Continued)

(52) U.S. Cl.
CPC ......... *H04N 23/687* (2023.01); *G02B 27/646* (2013.01); *G03B 5/00* (2013.01);
(Continued)

(58) Field of Classification Search
CPC .. H04N 23/687; H04N 23/6812; H04N 23/51; G03B 5/00; G02B 27/646
See application file for complete search history.

(56) References Cited

U.S. PATENT DOCUMENTS

2002/0047906 A1* 4/2002 Ohta .................. H04N 23/6812
348/208.99
2007/0279765 A1 12/2007 Takahashi
(Continued)

FOREIGN PATENT DOCUMENTS

CN 101082753 A 12/2007
CN 110741303 A 1/2020
(Continued)

OTHER PUBLICATIONS

Chinese Office Action Issued on Feb. 28, 2025, in Counterpart Chinese Patent Application No. 202210889302.3 (10 Pages in English, 11 Pages in Chinese).

*Primary Examiner* — Nicholas G Giles
(74) *Attorney, Agent, or Firm* — NSIP Law

(57) ABSTRACT

A camera apparatus includes a camera body portion including a prism unit, a lens assembly, and an image sensor unit, a gyro sensor detecting a hand-shake with respect to the camera body portion and outputting gyro sensor information, a driver circuit generating at least one of a prism driving signal for image stabilization of the prism unit and a sensor driving signal for image stabilization of the image sensor unit based on the gyro sensor information, a prism actuator disposed in the camera body portion for driving the prism unit and performing image stabilization on the prism unit in response to the prism driving signal, and a sensor actuator disposed in the camera body portion for driving the image sensor unit and performing image stabilization on the image sensor unit in response to the sensor driving signal.

28 Claims, 9 Drawing Sheets

(51) Int. Cl.
*G03B 5/00* (2021.01)
*H04N 23/51* (2023.01)

(52) U.S. Cl.
CPC ......... *H04N 23/51* (2023.01); *H04N 23/6812* (2023.01); *G03B 2205/0007* (2013.01)

(56) References Cited

U.S. PATENT DOCUMENTS

| | | |
|---|---|---|
| 2017/0163896 A1 | 6/2017 | Kang et al. |
| 2019/0260938 A1* | 8/2019 | Tanaka ................. H04N 23/683 |
| 2019/0361225 A1 | 11/2019 | Cho et al. |
| 2020/0386979 A1 | 12/2020 | Hyodo |
| 2021/0080690 A1 | 3/2021 | Lee et al. |
| 2021/0195073 A1 | 6/2021 | Saito et al. |
| 2021/0266465 A1 | 8/2021 | Wang et al. |
| 2021/0294112 A1* | 9/2021 | Ko ....................... G02B 27/646 |

FOREIGN PATENT DOCUMENTS

| | | |
|---|---|---|
| CN | 111355872 A | 6/2020 |
| DE | 20 2016 002 484 U1 | 8/2016 |
| JP | 2021-99417 A | 7/2021 |
| KR | 10-2014-0041260 A | 4/2014 |
| KR | 10-2017-0065235 A | 6/2017 |
| KR | 10-2019-0061439 A | 6/2019 |
| KR | 10-2019-0071569 A | 6/2019 |

* cited by examiner

MULTI-IMAGE STABILIZATION DEVICE AND CAMERA APPARATUS, AND MULTI-IMAGE STABILIZATION METHOD

CROSS-REFERENCE TO RELATED APPLICATIONS

This application claims the benefit under 35 USC 119(a) of Korean Patent Application Nos. 10-2021-0107437 filed on Aug. 13, 2021, and 10-2022-0044524 filed on Apr. 11, 2022, in the Korean Intellectual Property Office, the entire disclosures of which are incorporated herein by reference for all purposes.

BACKGROUND

1. Field

The present disclosure relates to a multi-image stabilization device, a camera apparatus, and a multi-image stabilization method.

2. Description of the Background

Camera apparatuses applied to mobile devices such as smartphones may be equipped with image stabilization technology.

Smartphones may have a technology capable of compensating for high-angle hand-shake, such as a gimbal, or a sensor-shift technology to compensate for high-frequency hand-shake.

Existing smartphones may employ a lens-shift method for shifting a position of a lens assembly or a sensor-shift method for shifting a position of an image sensor for image stabilization.

For example, in the lens shift method, an angle and frequency of hand-shake are measured using a gyro sensor, and a driver circuit (driver IC) shifts a lens in a direction opposite to a direction of a hand-shake using the measured information.

Also, in the sensor-shift method, the angle and frequency of a hand-shake are measured using a gyro sensor, and the driver circuit (driver IC) performs correction by shifting an image sensor in a direction opposite to a direction of a hand-shake using the measured information.

However, since existing smartphones employ the lens-shift method or the sensor-shift method, such existing smartphones may correct low-frequency hand-shake but may not correct high-frequency hand-shake or may correct high-frequency hand-shake but may not correct high-angle hand-shake. That is, existing smartphones may not correct both high-angle hand-shake and high-frequency hand-shake.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multi-image stabilization device includes a driver circuit generating at least one of a lens driving signal for image stabilization of a lens assembly of a camera body portion and a sensor driving signal for image stabilization of an image sensor unit of the camera body portion based on gyro sensor information input from a gyro sensor detecting a hand-shake of the camera body portion.

The driver circuit may generate the lens driving signal for high-angle image stabilization in an event of high-angle hand-shake and generate a sensor driving signal for high-frequency image stabilization in an event of a high-frequency hand-shake, based on the gyro sensor information.

The driver circuit may generate the lens driving signal for high-angle image stabilization in an event of a high-angle hand-shake and generate a sensor driving signal for rolling correction in an event of rolling, based on the gyro sensor information.

The driver circuit may generate the lens driving signal having a first driving current for high-angle and low-frequency image stabilization in an event of a high-angle hand-shake but not a high-frequency hand-shake based on the gyro sensor information, the driver circuit may generate the lens driving signal having a second driving current for high-angle and high-frequency image stabilization in an event of a high-angle hand-shake and a high-frequency hand-shake, the driver circuit may generate the lens driving signal having a third driving current for low-angle and low-frequency image stabilization in an event of not a high-angle hand-shake and not a high-frequency hand-shake, and the driver circuit may generate the sensor driving signal for low-angle and high-frequency image stabilization in an event of a high-frequency hand-shake but not a high-angle hand-shake.

In another general aspect, a camera apparatus includes a camera body portion including a lens assembly and an image sensor unit, a gyro sensor detecting a hand-shake with respect to the camera body portion and outputting gyro sensor information, a driver circuit generating at least one of a lens driving signal for image stabilization of the lens assembly and a sensor driving signal for image stabilization of the image sensor unit based on the gyro sensor information, a lens actuator disposed in the camera body portion for driving the lens assembly and performing image stabilization on the lens assembly in response to the lens driving signal, and a sensor actuator disposed in the camera body portion for driving the image sensor unit and performing image stabilization on the image sensor unit in response to the sensor driving signal.

The driver circuit may generate the lens driving signal for high-angle image stabilization in an event of a high-angle hand-shake and generate the sensor driving signal for high-frequency image stabilization in an event of a high-frequency hand-shake, based on the gyro sensor information.

The driver circuit may generate the lens driving signal for high-angle image stabilization in an event of a high-angle hand-shake and generate the sensor driving signal for rolling correction in an event of rolling, based on the gyro sensor information.

The lens actuator may perform shift correction on the high-angle hand-shake of the lens assembly according to the lens driving signal.

The sensor actuator may perform shift correction on the high-frequency hand-shake of the image sensor unit according to the sensor driving signal.

The driver circuit may generate a lens driving signal for image stabilization of the lens assembly or a sensor driving signal for image stabilization of the image sensor unit.

The driver circuit may generate the lens driving signal for image stabilization of the lens assembly and the sensor driving signal for image stabilization of the image sensor unit.

In another general aspect, a camera apparatus includes a camera body portion including a prism unit, a lens assembly, and an image sensor unit, a gyro sensor detecting a hand-shake with respect to the camera body portion and outputting gyro sensor information, a driver circuit generating at least one of a prism driving signal for image stabilization of the prism unit and a sensor driving signal for image stabilization of the image sensor unit based on the gyro sensor information, a prism actuator disposed in the camera body portion for driving the prism unit and performing image stabilization on the prism unit in response to the prism driving signal, and a sensor actuator disposed in the camera body portion for driving the image sensor unit and performing image stabilization on the image sensor unit in response to the sensor driving signal.

The driver circuit may generate the prism driving signal for prism tilt correction in an event of a high-angle hand-shake and generate the sensor driving signal for high-frequency image stabilization in an event of a high-frequency hand-shake, based on the gyro sensor information.

The driver circuit may generate the prism driving signal for prism tilt correction in an event of a high-angle hand-shake and generate the sensor driving signal for rolling correction in an event of rolling, based on the gyro sensor information.

The driver circuit may generate the prism driving signal having a first driving current for high-angle and low-frequency image stabilization in an event of a high-angle hand-shake but not a high-frequency hand-shake based on the gyro sensor information, the driver circuit may generate the prism driving signal having a second driving current for high-angle and high-frequency image stabilization in an event of a high-angle hand-shake and a high-frequency hand-shake, the driver circuit may generate the prism driving signal having a third driving current for low-angle and low-frequency image stabilization in an event of not a high-angle hand-shake and not a high-frequency hand-shake, and the driver circuit may generate the sensor driving signal for low-angle and high-frequency image stabilization in an event of a high-frequency hand-shake but not a high-angle hand-shake.

The prism actuator may perform tilt correction on a high-angle hand-shake of the prism unit according to the prism driving signal.

The sensor actuator may perform shift correction on a high-frequency hand-shake of the image sensor unit according to the sensor driving signal.

The driver circuit may generate a prism driving signal for image stabilization of the prism unit or a sensor driving signal for image stabilization of the image sensor unit.

The driver circuit may generate a prism driving signal for image stabilization of the prism unit and a sensor driving signal for image stabilization of the image sensor unit.

In another general aspect, a multi-image stabilization method includes receiving gyro sensor information from a gyro sensor detecting a hand-shake of a camera body portion, determining a hand-shake of the camera body portion based on the gyro sensor information, and a driving operation of performing lens shift correction on a lens assembly of the camera body portion or performing tilt correction on a prism unit of the camera body portion in an event of a high-angle hand-shake, and performing sensor shift correction or rolling correction on an image sensor unit of the camera body portion in an event of high-frequency hand-shake according to the hand-shake determination result.

In the driving operation, in the event of the high-angle hand-shake according to the hand-shake determination result, a lens driving signal for high-angle image stabilization with respect to the lens assembly or a prism driving signal for high-angle image stabilization with respect to the prism unit may be generated.

In the driving operation, in the event of the high-frequency hand-shake according to the hand-shake determination result, a sensor driving signal for sensor shift correction or rolling correction with respect to the image sensor unit may be generated.

In the driving operation, according to the hand-shake determination result, a lens driving signal having a first driving current for high-angle and low-frequency image stabilization may be generated in an event of a high-angle hand-shake but not a high-frequency hand-shake, a lens driving signal having a second driving current for high-angle and high-frequency image stabilization may be generated in an event of a high-angle hand-shake and a high-frequency hand-shake, a lens driving signal having a third driving current for low-angle and low-frequency image stabilization may be generated in an event of not a high-angle hand-shake and not a high-frequency hand-shake, and a sensor driving signal for low-angle and high-frequency image stabilization may be generated in an event of a high-frequency hand-shake but not a high-angle hand-shake.

In the driving operation, according to the hand-shake determination result, sensor rolling driving may be performed on the image sensor unit in an event of rolling but not a hand-shake, lens shift driving may be performed on the lens assembly and sensor rolling driving may be performed on the image sensor unit in an event of rolling and a hand-shake, lens shift driving may be performed on the lens assembly in an event of not rolling and in an event of a hand-shake, and correction may not be performed in the event of not rolling nor hand-shake.

In the driving operation, according to the hand-shake determination result, sensor rolling correction may be performed on the image sensor unit in an event of rolling but not a hand-shake, lens shift correction may be performed on the lens assembly and sensor rolling correction may be performed on the image sensor unit in an event of rolling and a hand-shake, sensor shift correction may be performed on the image sensor unit in an event of high-frequency hand-shake but not a high-angle hand-shake in an event of not rolling, lens shift correction may be performed on the lens assembly in an event of a high-angle hand-shake but not rolling, and correction may not be performed in a case of not rolling nor hand-shake.

In another general aspect, a multi-image stabilization device includes a driver circuit generating one or more of a sensor driving signal for image stabilization of an image sensor unit of the camera body portion and a lens driving signal for image stabilization of a lens assembly of a camera body portion or a prism driving signal for image stabilization of a prism unit of the camera body portion, based on gyro sensor information input from a gyro sensor detecting a hand-shake of the camera body portion.

The driver circuit may generate the lens driving signal or the prism driving signal for high-angle image stabilization in an event of high-angle hand-shake, and generate a sensor driving signal for high-frequency image stabilization in an event of a high-frequency hand-shake, based on the gyro sensor information.

The driver circuit may generate the lens driving signal or the prism driving signal for high-angle image stabilization in an event of a high-angle hand-shake and generates a sensor driving signal for rolling correction in an event of rolling, based on the gyro sensor information.

A camera apparatus may include the multi-image stabilization device, the camera body portion comprising the lens assembly or the prism unit, and the image sensor unit, the gyro sensor, a lens actuator disposed in the camera body portion for driving the lens assembly and performing image stabilization on the lens assembly in response to the lens driving signal or a prism actuator disposed in the camera body portion for driving the prism unit and performing image stabilization on the prism unit in response to the prism driving signal, and a sensor actuator disposed in the camera body portion for driving the image sensor unit and performing image stabilization on the image sensor unit in response to the sensor driving signal.

The driver circuit may generate the lens driving signal or the prism driving signal, having a first driving current for high-angle and low-frequency image stabilization in an event of a high-angle hand-shake but not a high-frequency hand-shake based on the gyro sensor information, the driver circuit may generate the lens driving signal or the prism driving signal, having a second driving current for high-angle and high-frequency image stabilization in an event of a high-angle hand-shake and a high-frequency hand-shake, the driver circuit may generate the lens driving signal or the prism driving signal, having a third driving current for low-angle and low-frequency image stabilization in an event of not a high-angle hand-shake and not a high-frequency hand-shake, and the driver circuit may generate the sensor driving signal for low-angle and high-frequency image stabilization in an event of a high-frequency hand-shake but not a high-angle hand-shake.

The lens actuator may perform shift correction on a high-angle hand-shake of the lens assembly according to the lens driving signal or the prism actuator may perform tilt correction on a high-angle hand-shake of the prism unit according to the prism driving signal.

The driver circuit may generate the lens driving signal for image stabilization of the lens assembly or the prism driving signal for image stabilization of the prism unit, or the sensor driving signal for image stabilization of the image sensor unit.

The driver circuit may generate the sensor driving signal for image stabilization of the image sensor unit and the lens driving signal for image stabilization of the lens assembly or the prism driving signal for image stabilization of the prism unit.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
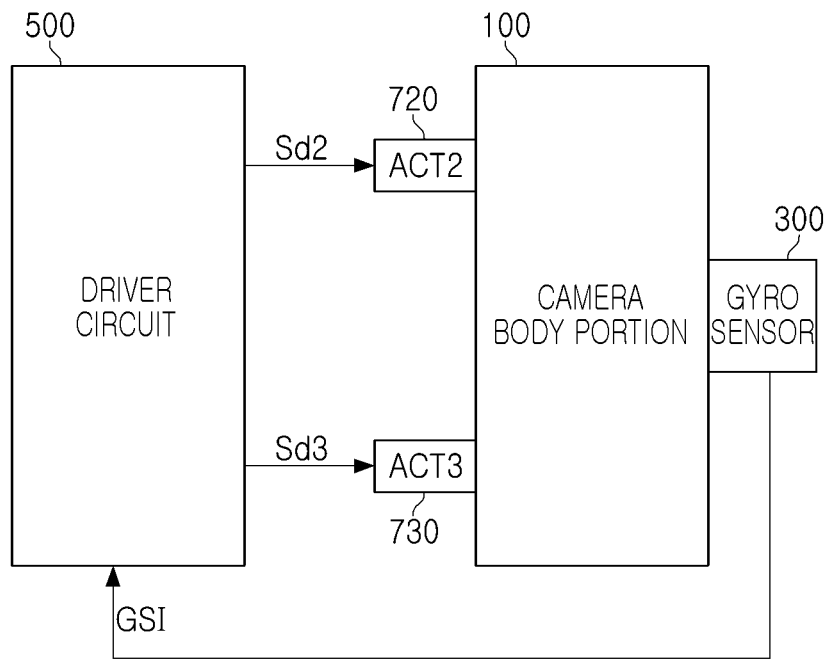
FIG. 1 is a view illustrating a multi-image stabilization device according to an example embodiment of the present disclosure.

Hereinafter, while example embodiments of the present disclosure will be described, for example, with reference to the accompanying drawings, it is noted that example embodiments are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one of the associated listed items and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Example embodiments provide a multi-image stabilization device, a camera apparatus, and a multi-image stabilization method capable of correcting both high-frequency hand-shake and high-angle hand-shake using a lens-shift (or prism-tilt) technology and a sensor-shift technology.

FIG. 1 is a view illustrating a multi-image stabilization device according to an example embodiment of the present disclosure.

Referring to FIG. 1, a multi-image stabilization device according to an example embodiment of the present disclosure may include a driver circuit 500.

The driver circuit 500 may generate at least one of a lens driving signal Sd2 for image stabilization of a lens assembly 120 of a camera body portion 100 and a sensor driving signal Sd3 for image stabilization of an image sensor unit 130 of the camera body portion 100, based on gyro sensor information GSI input from a gyro sensor 300 detecting a hand-shake of the camera body portion 100.

For example, the driver circuit 500 analyzes the gyro sensor information GSI to determine whether it is a high-angle hand-shake or high-frequency hand-shake, and in the event of the high-angle hand-shake according to a determination result, the driver circuit 500 may drive a lens actuator ACT2 720 for lens shift correction, and in the event of high-frequency hand-shake, the driver circuit 500 may drive a sensor actuator ACT3 730 for sensor-shift correction.

The lens actuator ACT2 720 and the sensor actuator ACT3 730 may be formed of a voice coil motor (VCM) actuator, but is not limited thereto.

For example, the lens actuator ACT2 720 may include a driving coil disposed in a housing 101 (FIG. 4) to generate an electromagnetic force as a driving force in accordance with a lens driving signal and a magnet disposed in the lens assembly to be moved by a driving force from the lens driving coil.

A camera apparatus including the driver circuit 500 as described above includes an image stabilization technology that combines the advantages of a lens-shift image stabilization technology and a sensor-shift image stabilization technology, and a new driver integrated circuit (IC) (or a control unit) for controlling the two image stabilization technologies is disclosed.

In the camera apparatus of the present disclosure, the lens-shift technology may perform a high-angle image stabilization by increasing a distance for moving a lens, and the sensor-shift technology may perform high-frequency image stabilization because an image sensor is lighter than a lens even though it may be difficult to correct a high angle due to a connection of a stretchable printed circuit board (PCB), which will be described in detail hereinafter.

Figure 2:
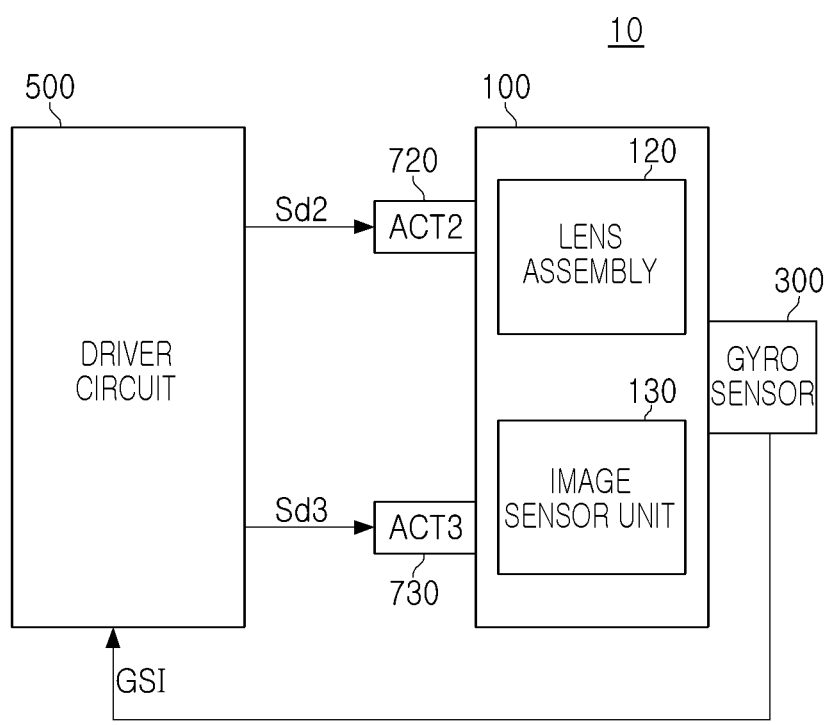
FIG. 2 is a view illustrating a vertical camera apparatus according to an example embodiment of the present disclosure.

FIG. 2 is a view illustrating a vertical camera apparatus according to an example embodiment of the present disclosure.

Referring to FIG. 2, a vertical camera apparatus 10 according to an example embodiment of the present disclosure may include a camera body portion 100, a gyro sensor 300, a driver circuit 500, a lens actuator 720, and a sensor actuator 730.

The camera body portion 100 may include a lens assembly 120 including a plurality of lenses and an image sensor unit 130 including a plurality of image sensors.

The gyro sensor 300 may be disposed in the camera body portion 100, detect a hand-shake with respect to the camera body portion 100, and output gyro sensor information GSI to the driver circuit 500.

The driver circuit 500 may generate at least one of a lens driving signal Sd2 for image stabilization of the lens assembly 120 and a sensor driving signal Sd3 for image stabilization of the image sensor unit 130 based on the gyro sensor information GSI.

For example, based on the gyro sensor information GSI, the driver circuit 500 may generate the lens driving signal Sd2 for image stabilization of the lens assembly 120 in the event of a high-angle hand-shake, may generate the sensor driving signal Sd3 for image stabilization of the image sensor unit 130 in the event of high-frequency hand-shake, and may generate the lens driving signal Sd2 and the sensor driving signal Sd3 in the event of both a high-angle hand-shake and high-frequency hand-shake.

The lens actuator 720 may be disposed in the camera body portion 100 to drive the lens assembly 120, and may perform image stabilization on the lens assembly 120 in response to the lens driving signal Sd2.

The sensor actuator 730 may be disposed in the camera body portion 100 to drive the image sensor unit 130, and may perform image stabilization on the image sensor unit 130 in response to the sensor driving signal Sd3.

For each drawing of the present disclosure, unnecessary redundant descriptions of components having the same reference numerals and the same functions may be omitted, and differences may be described for each drawing.

Figure 3:
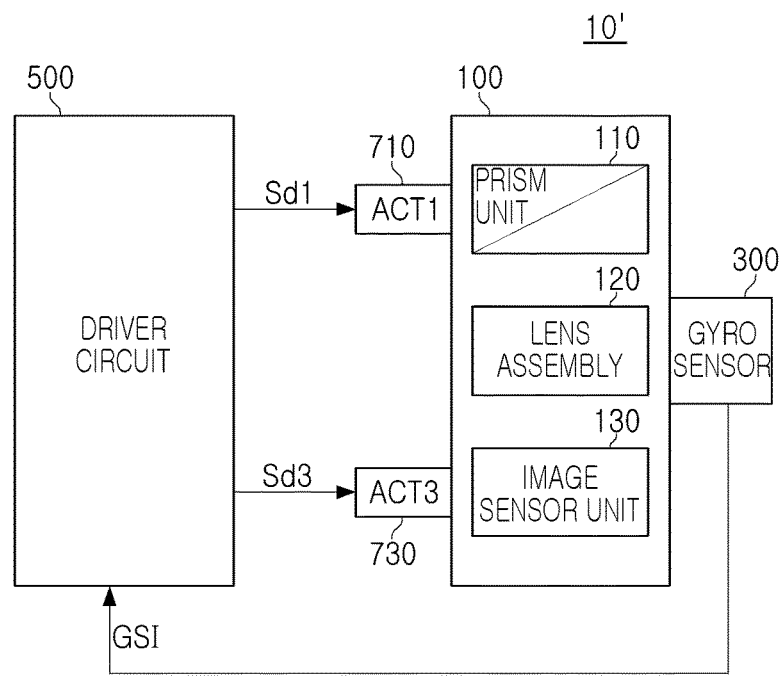
FIG. 3 is a view illustrating a folded type camera apparatus according to an example embodiment of the present disclosure.

FIG. 3 is a view illustrating a folded type camera apparatus according to an example embodiment of the present disclosure.

Referring to FIG. 3, a folded type camera apparatus 10' according to an example embodiment of the present disclosure may include a camera body portion 100, a gyro sensor 300, a driver circuit 500, a prism actuator 710, and a sensor actuator 730.

The camera body portion 100 may include a prism unit 110 for changing an optical axis, a lens assembly 120 including a plurality of lenses, and an image sensor unit 130 including a plurality of image sensors.

The gyro sensor 300 may be disposed in the camera body portion 100 to detect a hand-shake with respect to the camera body portion 100 and output gyro sensor information GSI to the driver circuit 500.

The driver circuit 500 may generate at least one of a prism driving signal Sd1 for image stabilization of the prism unit 110 and a sensor driving signal Sd3 for image stabilization of the image sensor unit 130 based on the gyro sensor information GSI.

For example, based on the gyro sensor information GSI, the driver circuit 500 may generate a prism driving signal Sd1 for tilt correction of the prism unit 110 in the event of a high-angle hand-shake, may generate a sensor driving signal Sd3 for image stabilization of the image sensor unit 130 in the event of high-frequency hand-shake, and may generate the prism driving signal Sd1 and the sensor driving signal Sd3 in the event of both the high-angle hand-shake and the high-frequency hand-shake.

The prism actuator 710 may be disposed in the camera body portion 100 to drive the prism unit 110, and may perform image stabilization on the prism unit 110 in response to the prism driving signal Sd1.

For example, the prism actuator 710 may be formed of a voice coil motor (VCM) actuator, but is not limited thereto. For example, the prism actuator 710 may include a prism driving coil disposed at the housing 101 (of FIG. 4) to generate an electromagnetic force as a driving force according to a prism driving signal and a magnet disposed at the prism unit and moved by the driving force of the prism driving coil.

In addition, the sensor actuator 730 may be disposed in the camera body portion 100 to drive the image sensor unit 130, and perform image stabilization on the image sensor unit 130 in response to the sensor driving signal Sd3.

Figure 4:
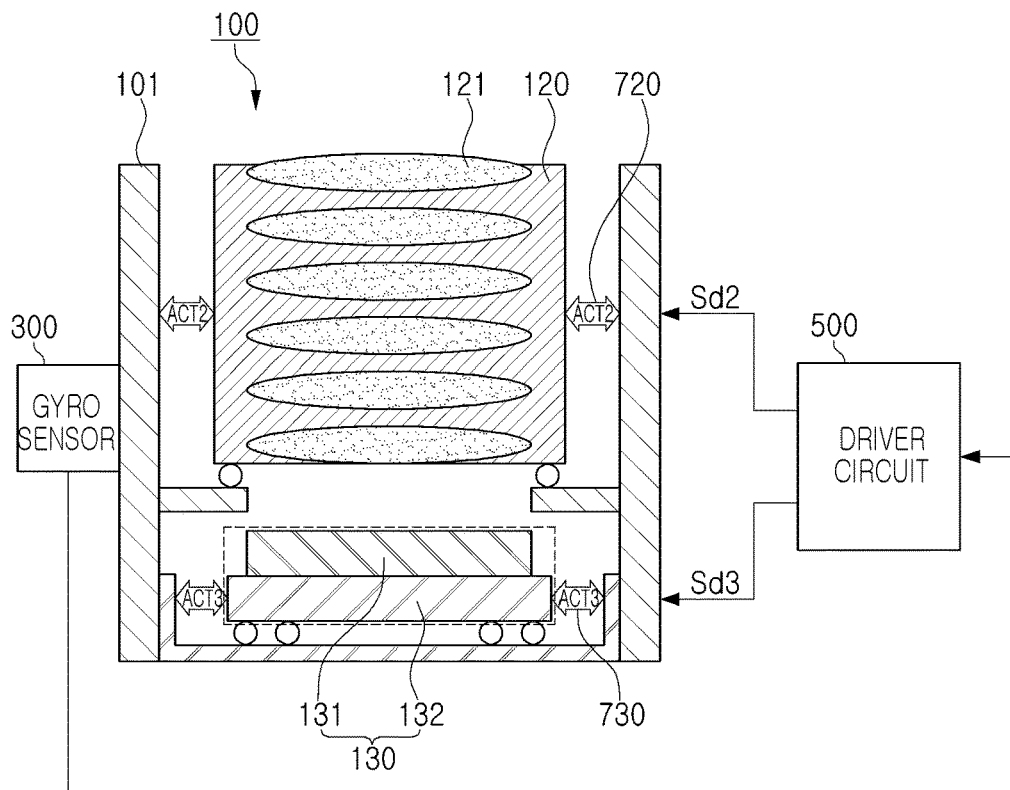
FIG. 4 is a view illustrating a camera body portion of the vertical camera apparatus of FIG. 2.

FIG. 4 is a view illustrating a camera body portion of the vertical camera apparatus of FIG. 2.

Referring to FIG. 4, the camera body portion 100 may include a lens assembly 120 disposed inside the housing 101 and an image sensor unit 130.

The lens assembly 120 may include one or more lenses 121, for example, the lens assembly 120 may include two or more lenses 121. For example, the lens assembly 120 may be moved in position in an axis (e.g., X-axis or Y-axis) direction, perpendicular to an optical axis (e.g., Z-axis), by the lens actuator ACT2 720. According to the position movement of the lens assembly 120, shift correction may be performed on a high-angle hand-shake of the camera body portion 100.

The image sensor unit 130 may include an image sensor 131 converting incident image light into an image signal and a substrate 132 on which the image sensor 131 is disposed. The substrate 132 may be a PCB substrate, but is not limited thereto.

For example, the image sensor unit 130 may move in position in an axis (e.g., X-axis or Y-axis) direction, perpendicular to an optical axis (e.g., Z-axis), by the sensor actuator ACTS 730. According to the movement of the image sensor unit 130 as described above, shift correction may be performed on high-frequency hand-shake of the camera body portion 100.

Figure 5:
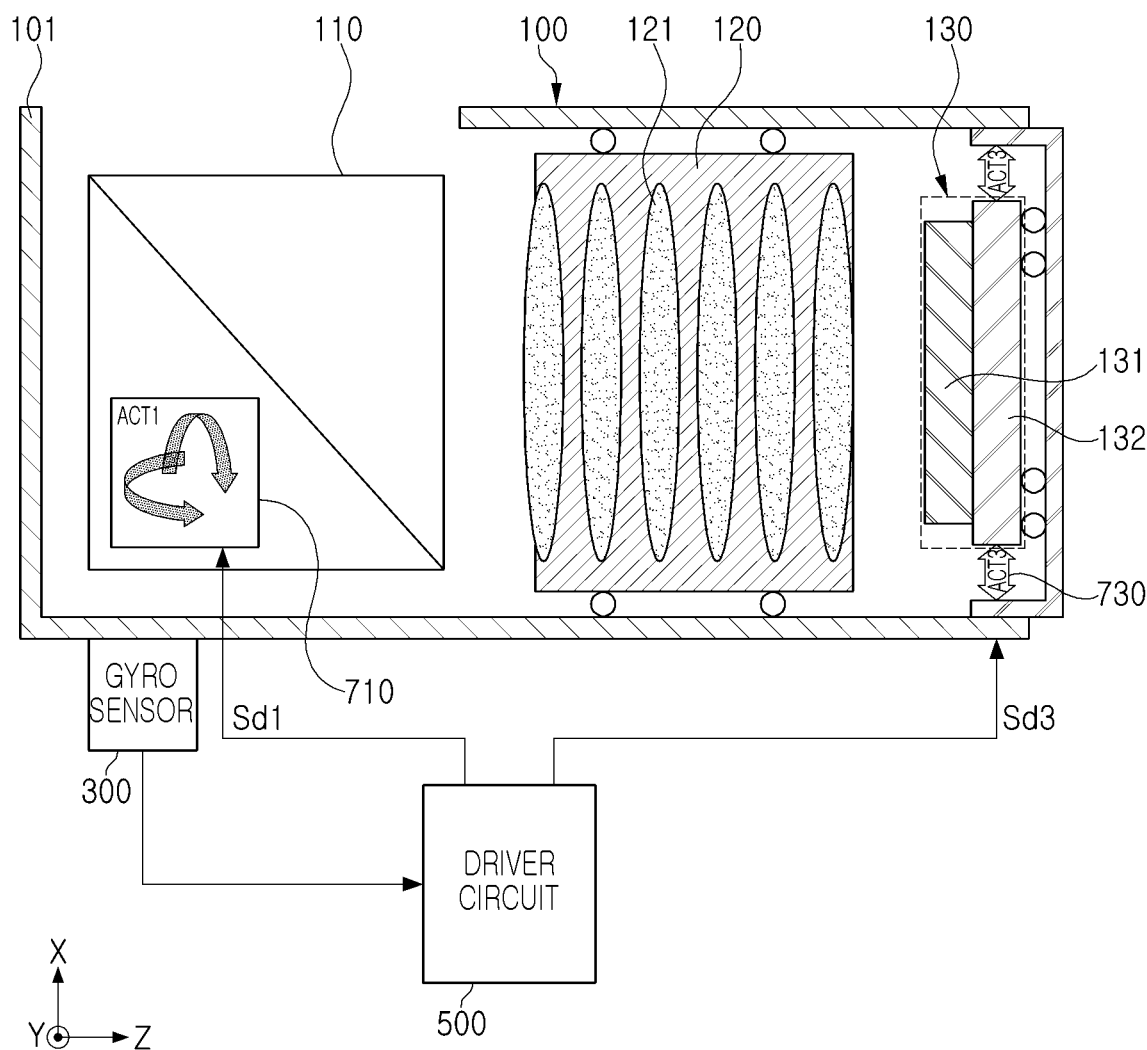
FIG. 5 is a view illustrating a camera body portion of the folded type camera apparatus of FIG. 4.

FIG. 5 is a view illustrating a camera body portion of the folded type camera apparatus of FIG. 3.

Referring to FIG. 5, the camera body portion 100 may include a prism part 110, a lens assembly 120, and an image sensor unit 130 disposed inside the housing 101.

In order to change an incident optical axis, the prism unit 110 may be disposed at an entrance side on which light from the camera body portion 100 is incident, and may change light incident in the X-axis direction into light in the Z-axis direction. For example, the prism unit 110 may be moved vertically and horizontally by the prism actuator ACT1 710. According to the movement of the prism unit 110, tilt correction may be performed on a high-angle hand-shake of the camera body portion 100.

The lens assembly 120 may include one or more lenses 121, for example, the lens assembly 120 may include two or more lenses 121.

The image sensor unit 130 may include an image sensor 131 converting incident image light into an image signal, and a substrate 132 on which the image sensor 131 is disposed. The substrate 132 may be a PCB substrate, but is not limited thereto.

For example, the image sensor unit 130 may move in position in an axis (e.g., X-axis or Y-axis) direction, perpendicular to an optical axis (e.g., Z-axis), by the sensor actuator ACTS 730. According to the movement of the image sensor unit 130 as described above, shift correction may be performed on high-frequency hand-shake of the camera body portion 100.

Meanwhile, the lens assembly 120 and the image sensor unit 130 illustrated in FIGS. 4 and 5 are ball-type and may be moved in a vertical axis (e.g., X-axis or Y-axis) direction, perpendicular to the optical axis (e.g., the Z-axis), and alternatively, a position movement method, rather than the ball type, may also be applied, and thus, the present disclosure is not limited to the illustrated ball type.

Hereinafter, a multi-image stabilization method according to an example embodiment of the present disclosure will be described with reference to FIGS. 6 to 14. In the present disclosure, the description of the multi-image stabilization device or the camera apparatus and the description of the multi-image stabilization method may be applied to each other unless otherwise specified. That is, the description made with reference to FIGS. 1 to 5 may be applied, and accordingly, redundant description may be omitted in the description of the multi-image stabilization method.

Figure 6:
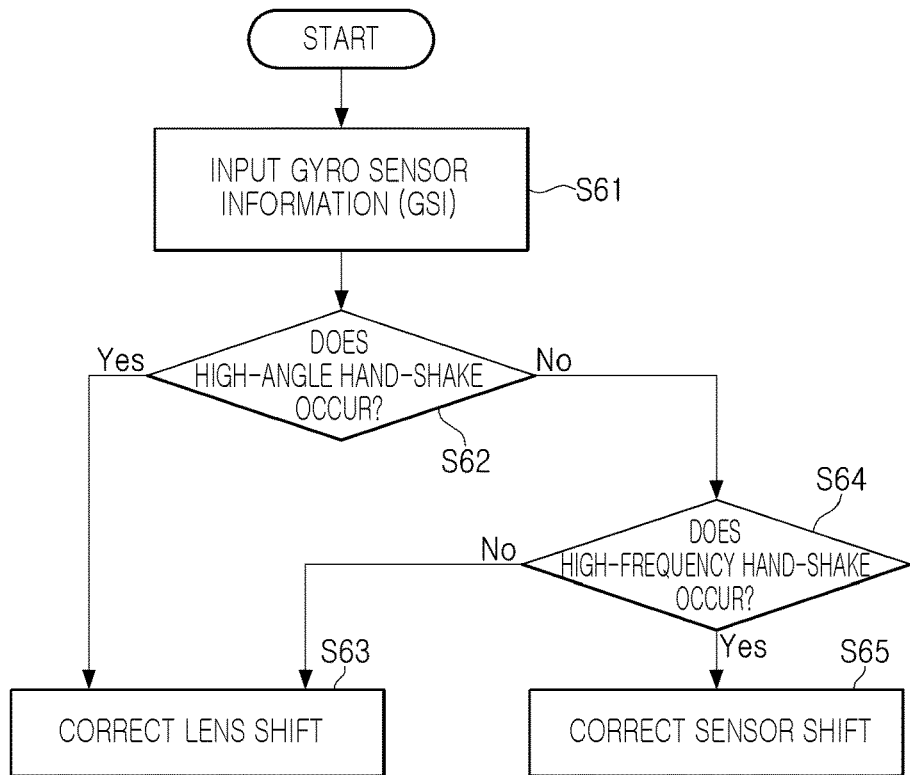
FIG. 6 is a view illustrating multi-image stabilization of a vertical camera apparatus.

FIG. 6 is a view illustrating multi-image stabilization of a vertical camera apparatus.

Referring to FIG. 6, the driver circuit 500 receives gyro sensor information GSI from the gyro sensor 300 (S61) and determines a hand-shake of the camera body portion 100 based on the gyro sensor information GSI (S62, S64). In the event of a high-angle hand-shake according to the hand-shake determination result, the driver circuit 500 may generate the lens driving signal Sd2 for high-angle image stabilization and perform a lens shift correction on the lens assembly 120 using the lens driving signal Sd2 (S63).

In addition, in the event of high-frequency hand-shake according to the hand-shake determination result, the driver circuit 500 may generate the sensor driving signal Sd3 for high-frequency image stabilization and perform a sensor shift correction on the image sensor unit 130 using the sensor driving signal Sd3 (S65).

In addition, in the event of not a high-angle hand-shake not high-frequency hand-shake according to the hand-shake determination result, the driver circuit 500 may generate the lens driving signal Sd2 for low-angle and low-frequency image stabilization and perform lens shift correction on the lens assembly 120 using the lens driving signal Sd2 (S62, S64, and S63).

Figure 7:
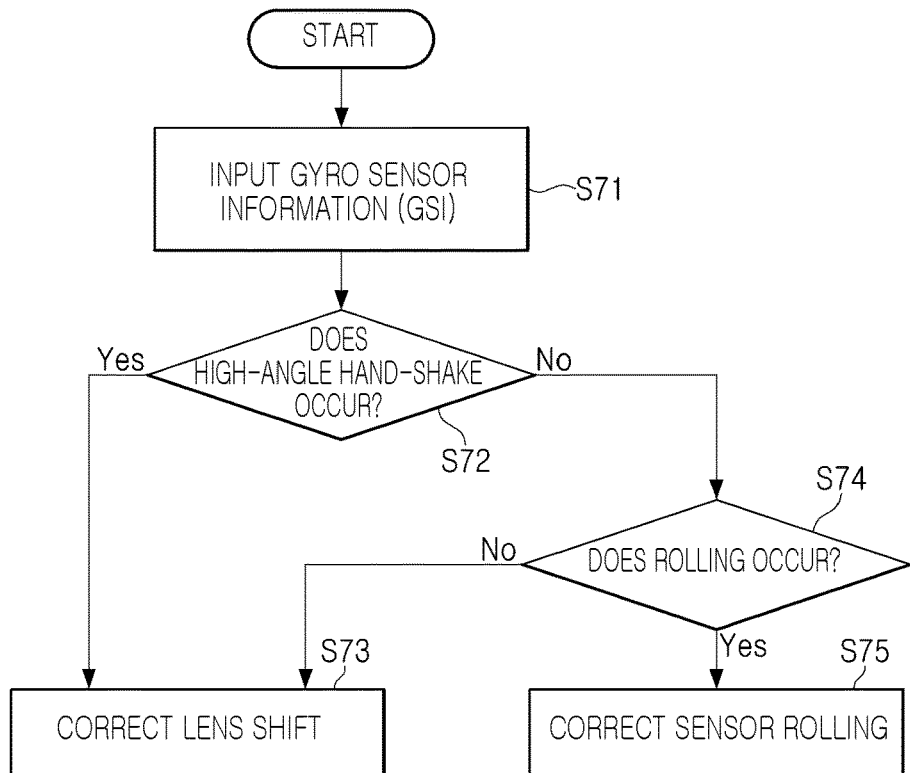
FIG. 7 is a view illustrating multi-image stabilization of a vertical camera apparatus.

FIG. 7 is a view illustrating multi-image stabilization of a vertical camera apparatus.

Referring to FIG. 7, the driver circuit 500 may determine a hand-shake of the camera body portion 100 based on the gyro sensor information GSI. In the event of a high-angle hand-shake according to the hand-shake determination result, the driver circuit 500 may generate the lens driving signal Sd2 for high-angle image stabilization and perform a lens shift correction on the lens assembly 120 using the lens driving signal Sd2 (S71 to S73).

In addition, in the event of rolling (See, FIG. 13) according to the hand-shake determination result, the driver circuit 500 may generate the sensor driving signal Sd3 for rolling correction and perform rolling correction on the image sensor unit 130 using the sensor driving signal Sd3 (S71, S72, S74, and S75).

In addition, in the event of not a high-angle hand-shake nor rolling according to the hand-shake determination result, the driver circuit 500 may generate the lens driving signal Sd2 for low-angle and low-frequency image stabilization and may perform lens shift correction on the lens assembly 120 using the lens driving signal Sd2 (S71, S72, S74, and S73).

Figure 8:
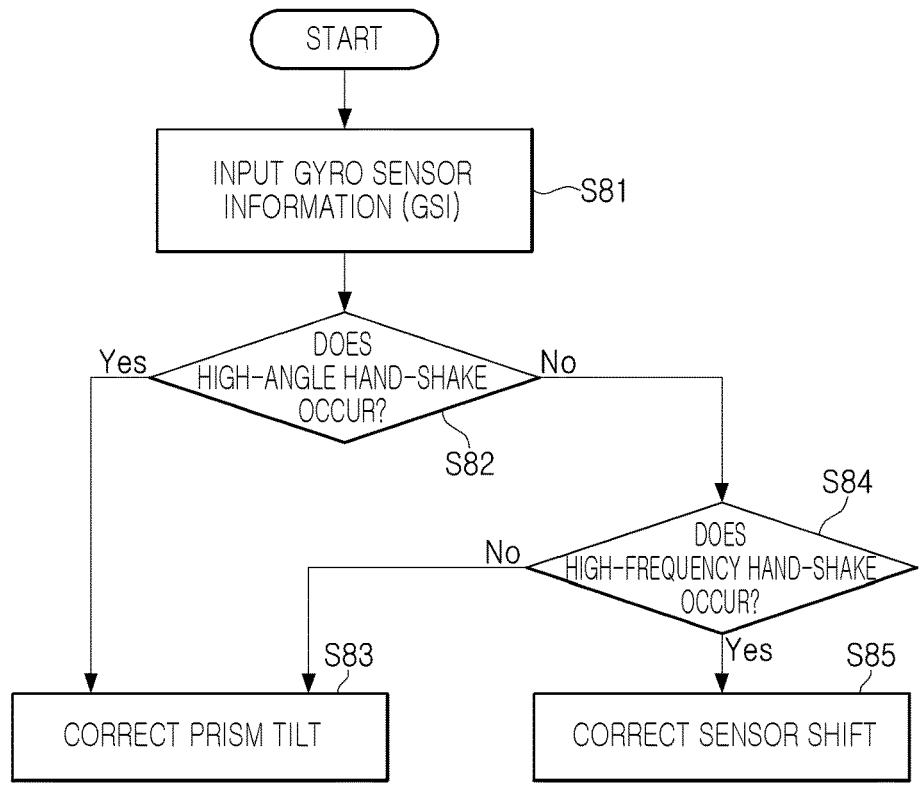
FIG. 8 is a view illustrating multi-image stabilization of a folded type camera apparatus.

FIG. 8 is a view illustrating multi-image stabilization of a folded type camera apparatus.

Referring to FIG. 8, the driver circuit 500 may determine a hand-shake of the camera body portion 100 based on the gyro sensor information GSI. In the event of a high-angle hand-shake according to the hand-shake determination result, the driver circuit 500 may generate the prism driving signal Sd1 for a high-angle image stabilization and perform prism tilt correction on the prism unit 110 using the prism driving signal Sd1 (S81 to S83).

In addition, in the event of high-frequency hand-shake according to the hand-shake determination result, the driver circuit 500 may generate the sensor driving signal Sd3 for high-frequency image stabilization and perform sensor shift correction on the image sensor unit 130 using the sensor driving signal Sd3 (S81, S82, S84, and S85).

In addition, in the event of not a high-angle hand-shake nor high-frequency hand-shake according to the hand-shake determination result, the driver circuit 500 may generate the prism driving signal Sd1 for low-angle and low-frequency image stabilization and perform prism tilt correction on the prism unit 110 using the prism driving signal Sd1 (S81, S82, S84, and S83).

Figure 9:
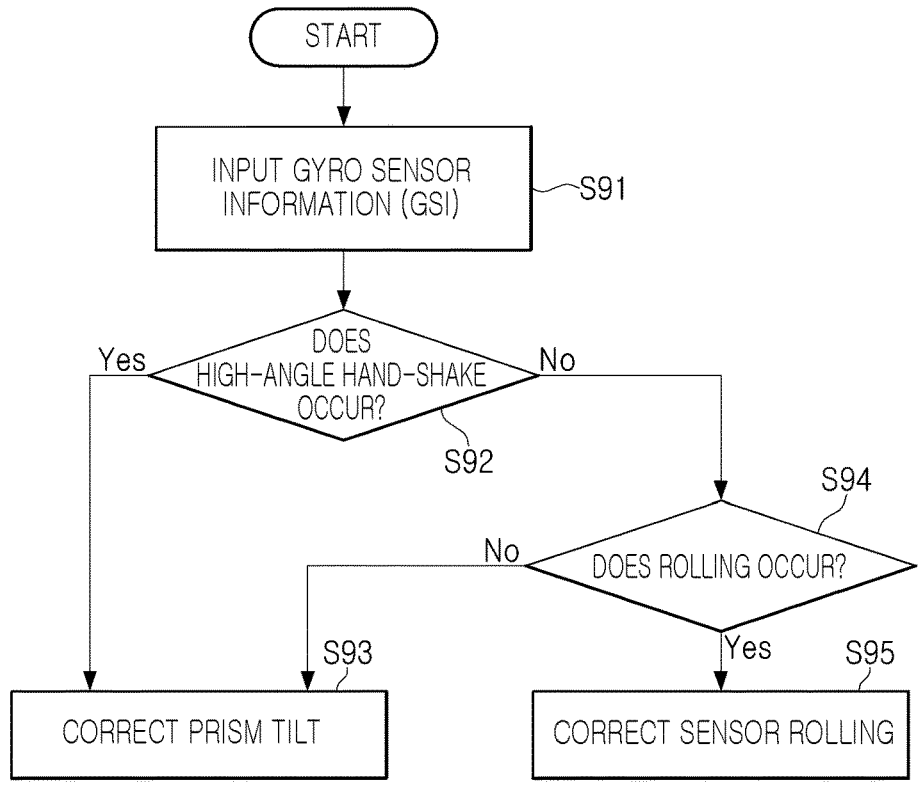
FIG. 9 is a view illustrating multi-image stabilization of a folded type camera apparatus.

FIG. 9 is a view illustrating multi-image stabilization of a folded type camera apparatus.

Referring to FIG. 9, the driver circuit 500 may determine a hand-shake of the camera body portion 100 based on the gyro sensor information GSI. In the event of a high-angle hand-shake according to the hand-shake determination result, the driver circuit 500 may generate the prism driving signal Sd1 for high-angle image stabilization and perform prism tilt correction on the prism unit 110 using the prism driving signal Sd1 (S91 to S93).

In the event of rolling according to the hand-shake determination result, the driver circuit 500 may generate the sensor driving signal Sd3 for rolling correction and may perform rolling correction on the image sensor unit 130 using the sensor driving signal Sd3 (S91, S92, S94, and S95).

In addition, in the event of not a high-angle hand-shake nor rolling according to the hand-shake determination result, the driver circuit 500 may generate the prism driving signal Sd1 for low-angle and low-frequency image stabilization and may perform prism tilt correction on the prism unit 110 using the prism driving signal Sd1 (S91, S92, S94, and S93).

Figure 10:
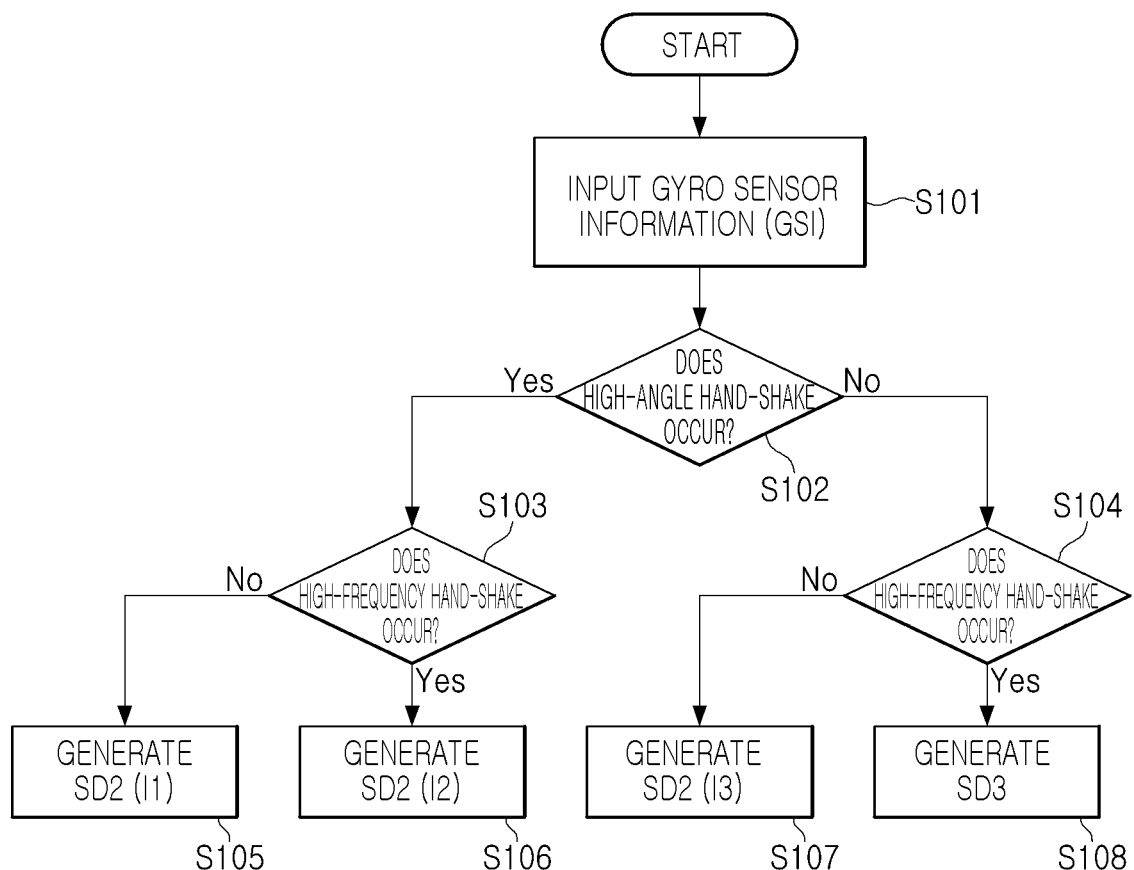
FIG. 10 is a view illustrating multi-image stabilization of a camera apparatus.

FIG. 10 is a view illustrating multi-image stabilization of a camera apparatus.

Referring to FIG. 10, the driver circuit 500 may determine a hand-shake of the camera body portion 100 based on the gyro sensor information GSI. In the event of a high-angle hand-shake, not high-frequency hand-shake according to the hand-shake determination result, the driver circuit 500 may generate the lens driving signal Sd2 having a first driving current for high-angle and low-frequency image stabilization and perform lens shift correction on the lens assembly 120 using the lens driving signal Sd2 (S101 to S103, and S105).

In the event of both a high-angle hand-shake and high-frequency hand-shake according to the hand-shake determination result, the driver circuit 500 may generate the lens driving signal Sd2 having a second driving current for high-angle and high-frequency image stabilization and perform lens shift correction on the lens assembly 120 using the lens driving signal Sd2 (S101 to S103, and S106).

In the event of not a high-angle hand-shake nor high-frequency hand-shake according to the hand-shake determination result, the driver circuit 500 may generate the lens driving signal Sd2 having a third driving current for low-angle and low-frequency image stabilization and perform lens shift correction on the lens assembly 120 using the lens driving signal Sd2 (S101, S102, S104, and S107).

In the event of not a high-angle hand-shake but high-frequency hand-shake according to the hand-shake determination result, the driver circuit 500 may generate the sensor driving signal Sd3 for low-angle and high-frequency image stabilization and perform sensor shift correction on the image sensor unit 130 using the sensor driving signal Sd3 (S101, S102, S104, and S108).

For example, the first driving current, the second driving current, and the third driving current may be different currents, and may be generated by a current generating circuit capable of controlling the generated current.

Figure 11:
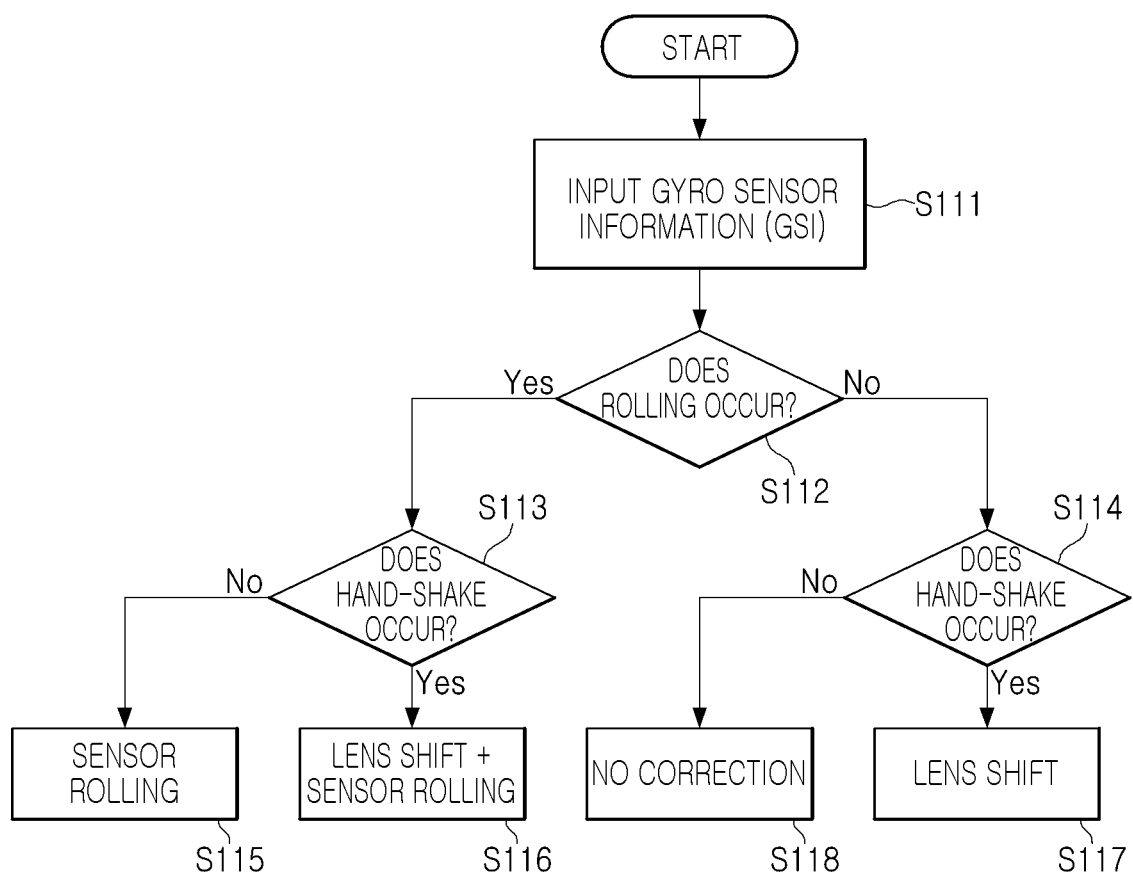
FIG. 11 is a view illustrating multi-image stabilization of a camera apparatus.

FIG. 11 is a view illustrating multi-image stabilization of a camera apparatus.

Referring to FIG. 11, the driver circuit 500 may determine a hand-shake of the camera body portion 100 based on the gyro sensor information GSI. In the event of rolling and not a hand-shake according to the hand-shake determination result, the driver circuit 500 may generate the sensor driving signal Sd3 for sensor rolling driving and perform sensor rolling correction on the image sensor unit 130 using the sensor driving signal Sd3 (S111 to S113, and S115).

In the event of rolling and a hand-shake according to the hand-shake determination result, the driver circuit 500 may generate the lens driving signal Sd2 and the sensor driving signal Sd3 for lens shift driving and sensor rolling driving and perform lens shift correction on the lens assembly 120 and sensor rolling correction on the image sensor unit 130 using the lens driving signal Sd2 and the sensor driving signal Sd3 (S111 to S113 and S116).

In the event of not rolling but a hand-shake according to the hand-shake determination result, the driver circuit 500 may generate the lens driving signal Sd2 for lens shift driving and perform lens shift correction on the lens assembly 120 using the lens driving signal Sd2 (S111, S112, S114, and S117).

In addition, in the event of no rolling nor hand-shake according to the hand-shake determination result, the driver circuit 500 does not perform correction (S111, S112, S114, and S118).

Figure 12:
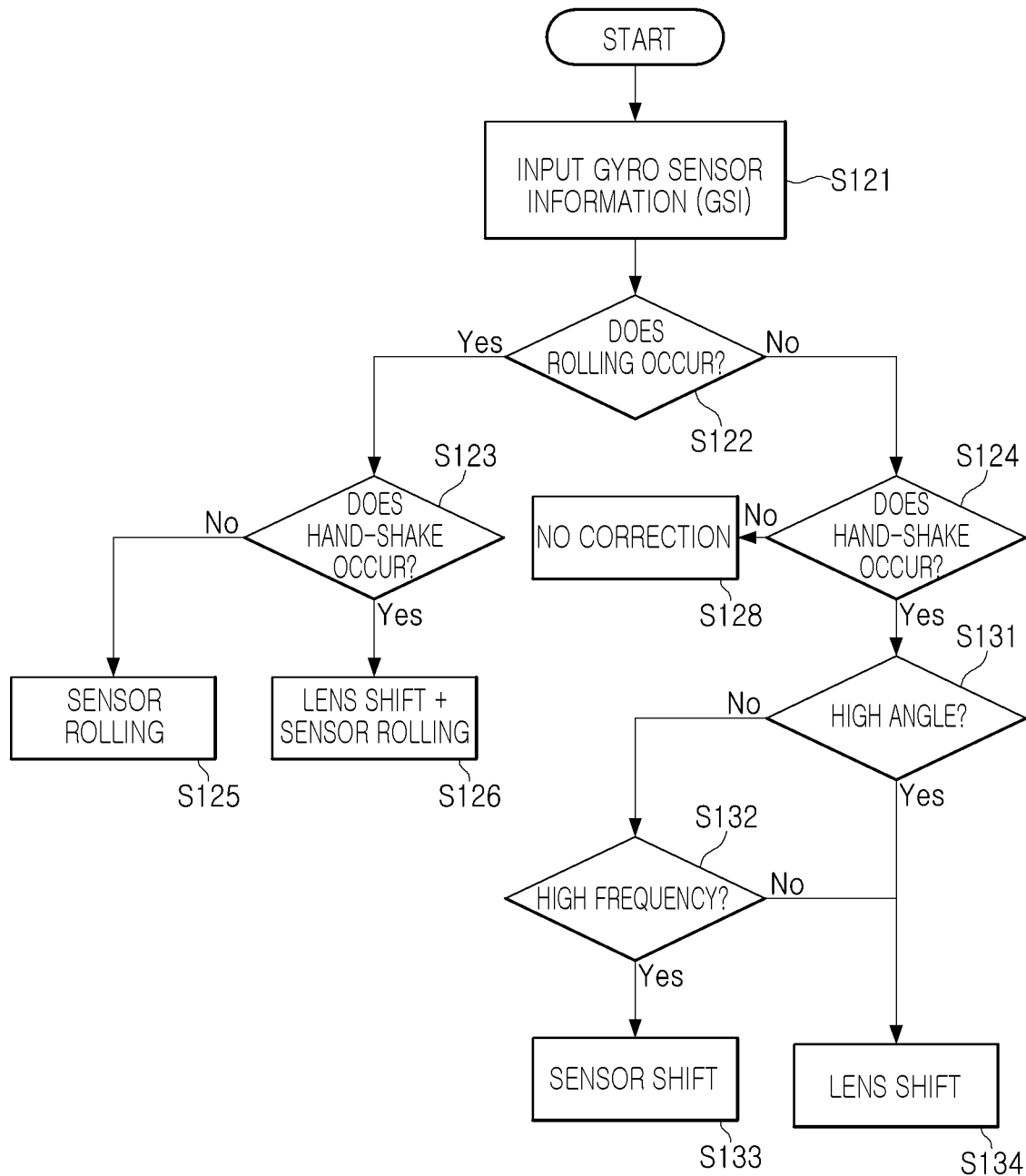
FIG. 12 is a view illustrating multi-image stabilization of a camera apparatus.

FIG. 12 is a view illustrating multi-image stabilization of a camera apparatus.

Referring to FIG. 12, the driver circuit 500 may determine a hand-shake of the camera body portion 100 based on the gyro sensor information GSI. In the event of rolling and not a hand-shake according to the hand-shake determination result, the driver circuit 500 may generate the sensor driving signal Sd3 for sensor rolling driving and perform sensor rolling correction on the image sensor unit 130 using the sensor driving signal Sd3 (S121 to S123, S125).

The driver circuit 500 may determine a hand-shake of the camera body portion 100, and in the event of rolling and a hand-shake, the driver circuit may generate the lens driving signal Sd2 and the sensor driving signal Sd3 for lens shift driving and sensor rolling driving and may perform lens shift correction on the lens assembly 120 and sensor rolling correction on the image sensor unit 130 using the lens driving signal Sd2 and the sensor driving signal Sd3 (S121 to S123, and S126).

The driver circuit 500 may determine a hand-shake of the camera body portion 100, and in the event of not rolling but a hand-shake and if the hand-tremor is high-frequency hand-shake, not a high-angle hand-shake, the driver circuit 500 may generate the sensor driving signal Sd3 for sensor shift driving and may perform sensor shift correction on the image sensor unit 130 using the sensor driving signal Sd3 (S121, S122, S124, S131 to S133).

The driver circuit 500 may determine a hand-shake of the camera body portion 100, and in the event of not rolling but a hand-shake and if the hand-tremor is a high-angle hand-shake, the driver circuit 500 may generate the lens driving signal Sd2 for lens shift driving and may perform lens shift correction on the lens assembly 120 using the lens driving signal Sd2 (S121, S122, S124, S131, and S134).

In addition, the driver circuit 500 may determine a hand-shake of the camera body portion 100, and in the event of not rolling nor hand-shake, the driver circuit may not perform correction (S121, S122, S124, and S128).

Figure 13:
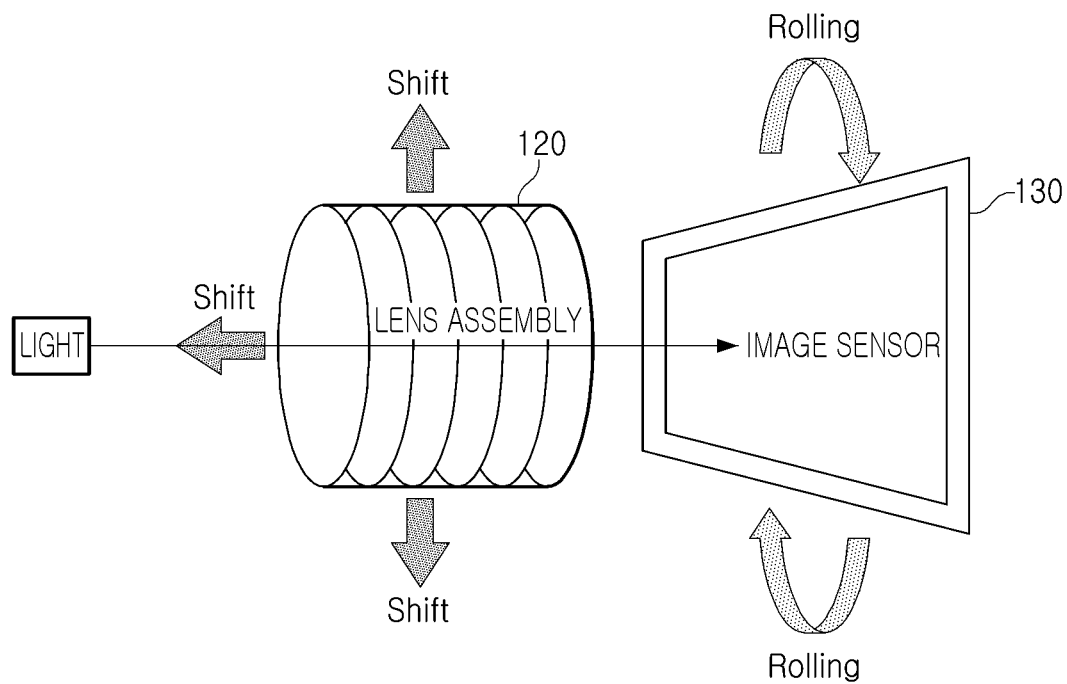
FIG. 13 is a view illustrating lens hand-shake correction and sensor rolling correction.

FIG. 13 is a view illustrating lens hand-shake correction and sensor rolling correction.

Referring to FIG. 13, for example, the lens actuator 720 may perform shift correction on a high-angle hand-shake of the lens assembly 120 according to the lens driving signal Sd2.

Also, the sensor actuator 730 may perform rolling correction (or sensor shift correction) on high-frequency hand-shake of the image sensor unit 130 according to the sensor driving signal Sd3.

Meanwhile, the driver circuit 500 may generate at least one of the lens driving signal Sd2 for image stabilization of the lens assembly 120 and the sensor driving signal Sd3 for image stabilization of the image sensor unit 130. For example, the driver circuit 500 may generate the lens driving signal Sd2 for image stabilization of the lens assembly 120. For example, the driver circuit 500 may generate the sensor driving signal Sd3 for image stabilization of the image sensor unit 130. For further example, the driver circuit 500 may generate both the lens driving signal Sd2 for image stabilization of the lens assembly 120 and the sensor driving signal Sd3 for image stabilization of the image sensor unit 130.

Figure 14:
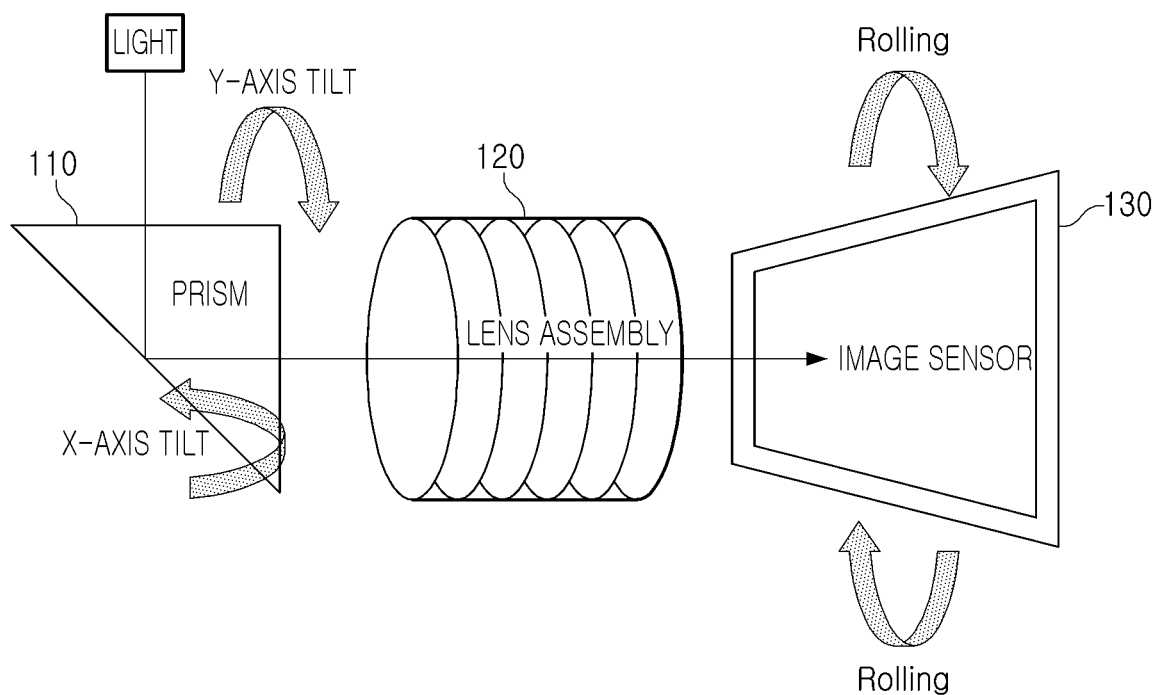
FIG. 14 is a view illustrating prism tilt correction and sensor rolling correction.

FIG. 14 is a view illustrating prism tilt correction and sensor rolling correction.

Referring to FIG. 14, in the event of a high-angle hand-shake based on the gyro sensor information GSI, the driver circuit 500 may generate the prism driving signal Sd1 for prism tilt correction and perform prism tilt correction on the prism unit 110 using the prism driving signal Sd1.

In the event of rolling (or high-frequency hand-shake) based on the gyro sensor information GSI, the driver circuit 500 may generate the sensor driving signal Sd3 for rolling correction (or sensor shift correction) and may perform rolling correction on the image sensor unit 130 using the sensor driving signal Sd3.

Meanwhile, the driver circuit 500 may generate at least one of the prism driving signal Sd1 for image stabilization of the prism unit 110 and the sensor driving signal Sd3 for image stabilization of the image sensor unit 130. For example, the driver circuit 500 may generate the prism driving signal Sd1 for image stabilization of the prism unit 110. For example, the driver circuit 500 may generate the sensor driving signal Sd3 for image stabilization of the image sensor unit 130. For example, the driver circuit 500 may generate both the prism driving signal Sd1 for image stabilization of the prism unit 110 and the sensor driving signal Sd3 for image stabilization of the image sensor unit 130.

Meanwhile, the driver circuit of the camera apparatus according to an example embodiment of the present disclosure may be implemented by a computing environment in which a processor (e.g., a central processing unit (CPU), a graphic processing unit (GPU), a microprocessor, an application specific integrated circuit (ASIC), a field programmable gate arrays (FPGA), etc.), a memory (e.g., volatile memory (such as RAM), non-volatile memory (such as ROM, flash memory, etc.), an input device (e.g., keyboard, mouse, pen, voice input device, touch input device, infrared camera, video input device, etc.), an output device (e.g., display, speaker, printer, etc.), and a communication connection device (e.g., modem, network interface card (NIC), integrated network interface, wireless frequency transmitter/receiver, infrared port, USB connection device, etc.) are interconnected (e.g. peripheral component interconnect (PCI), USB, firmware (IEEE 1394), optical bus structure, network, etc.).

The computing environment may be implemented as a distributed computing environment including a personal computer, a server computer, a handheld or laptop device, a mobile device (mobile phone, PDA, media player, etc.), a multiprocessor system, a consumer electronic device, a minicomputer, a mainframe computer, any of the foregoing systems or devices, but is not limited thereto.

As set forth above, according to an example embodiment of the present disclosure, both high-frequency hand-shake and high-angle hand-shake may be corrected by using the lens shift (or prism tilt) technology and the sensor shift technology.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-image stabilization device comprising:
a driver circuit generating at least one of a lens driving signal for image stabilization of a lens assembly of a camera body portion and a sensor driving signal for image stabilization of an image sensor unit of the camera body portion based on gyro sensor information input from a gyro sensor detecting a hand-shake of the camera body portion,
wherein
the driver circuit generates the lens driving signal having a first driving current for high-angle and low-frequency image stabilization in an event of a high-angle hand-shake but not a high-frequency hand-shake based on the gyro sensor information,
the driver circuit generates the lens driving signal having a second driving current for high-angle and high-frequency image stabilization in an event of a high-angle hand-shake and a high-frequency hand-shake,
the driver circuit generates the lens driving signal having a third driving current for low-angle and low-frequency image stabilization in an event of not a high-angle hand-shake and not a high-frequency hand-shake, and
the driver circuit generates the sensor driving signal for low-angle and high-frequency image stabilization in an event of a high-frequency hand-shake but not a high-angle hand-shake.

2. The multi-image stabilization device of claim 1, wherein the driver circuit generates the lens driving signal for high-angle image stabilization in an event of high-angle hand-shake and generates a sensor driving signal for high-frequency image stabilization in an event of a high-frequency hand-shake, based on the gyro sensor information.

3. The multi-image stabilization device of claim 1, wherein the driver circuit generates the lens driving signal for high-angle image stabilization in an event of a high-angle hand-shake and generates a sensor driving signal for rolling correction in an event of rolling, based on the gyro sensor information.

4. A camera apparatus comprising:
a camera body portion comprising a lens assembly and an image sensor unit;
a gyro sensor detecting a hand-shake with respect to the camera body portion and outputting gyro sensor information;
a driver circuit generating at least one of a lens driving signal for image stabilization of the lens assembly and a sensor driving signal for image stabilization of the image sensor unit based on the gyro sensor information;
a lens actuator disposed in the camera body portion for driving the lens assembly and performing image stabilization on the lens assembly in response to the lens driving signal; and
a sensor actuator disposed in the camera body portion for driving the image sensor unit and performing image stabilization on the image sensor unit in response to the sensor driving signal,
wherein
the driver circuit generates the lens driving signal having a first driving current for high-angle and low-frequency image stabilization in an event of a high-angle hand-shake but not a high-frequency hand-shake based on the gyro sensor information,
the driver circuit generates the lens driving signal having a second driving current for high-angle and high-frequency image stabilization in an event of a high-angle hand-shake and a high-frequency hand-shake,
the driver circuit generates the lens driving signal having a third driving current for low-angle and low-frequency image stabilization in an event of not a high-angle hand-shake and not a high-frequency hand-shake, and
the driver circuit generates the sensor driving signal for low-angle and high-frequency image stabilization in an event of a high-frequency hand-shake but not a high-angle hand-shake.

5. The camera apparatus of claim 4, wherein the driver circuit generates the lens driving signal for high-angle image stabilization in an event of a high-angle hand-shake and generates the sensor driving signal for high-frequency image stabilization in an event of a high-frequency hand-shake, based on the gyro sensor information.

6. The camera apparatus of claim 4, wherein the driver circuit generates the lens driving signal for high-angle image stabilization in an event of a high-angle hand-shake and generates the sensor driving signal for rolling correction in an event of rolling, based on the gyro sensor information.

7. The camera apparatus of claim 4, wherein the lens actuator performs shift correction on the high-angle hand-shake of the lens assembly according to the lens driving signal.

8. The camera apparatus of claim 4, wherein the sensor actuator performs shift correction on the high-frequency hand-shake of the image sensor unit according to the sensor driving signal.

9. The camera apparatus of claim 4, wherein the driver circuit generates a lens driving signal for image stabilization of the lens assembly or a sensor driving signal for image stabilization of the image sensor unit.

10. The camera apparatus of claim 4, wherein the driver circuit generates the lens driving signal for image stabilization of the lens assembly and the sensor driving signal for image stabilization of the image sensor unit.

11. A camera apparatus comprising:
a camera body portion comprising a prism unit, a lens assembly, and an image sensor unit;
a gyro sensor detecting a hand-shake with respect to the camera body portion and outputting gyro sensor information;
a driver circuit generating at least one of a prism driving signal for image stabilization of the prism unit and a sensor driving signal for image stabilization of the image sensor unit based on the gyro sensor information;
a prism actuator disposed in the camera body portion for driving the prism unit and performing image stabilization on the prism unit in response to the prism driving signal; and
a sensor actuator disposed in the camera body portion for driving the image sensor unit and performing image stabilization on the image sensor unit in response to the sensor driving signal,
wherein the prism unit folds an optical axis substantially ninety degrees, and
wherein
the driver circuit generates the prism driving signal having a first driving current for high-angle and low-frequency image stabilization in an event of a high-angle hand-shake but not a high-frequency hand-shake based on the gyro sensor information,
the driver circuit generates the prism driving signal having a second driving current for high-angle and high-frequency image stabilization in an event of a high-angle hand-shake and a high-frequency hand-shake,
the driver circuit generates the prism driving signal having a third driving current for low-angle and low-frequency image stabilization in an event of not a high-angle hand-shake and not a high-frequency hand-shake, and
the driver circuit generates the sensor driving signal for low-angle and high-frequency image stabilization in an event of a high-frequency hand-shake but not a high-angle hand-shake.

12. The camera apparatus of claim 11, wherein the driver circuit generates the prism driving signal for prism tilt correction in an event of a high-angle hand-shake and generates the sensor driving signal for high-frequency image stabilization in an event of a high-frequency hand-shake, based on the gyro sensor information.

13. The camera apparatus of claim 11, wherein the driver circuit generates the prism driving signal for prism tilt correction in an event of a high-angle hand-shake and generates the sensor driving signal for rolling correction in an event of rolling, based on the gyro sensor information.

14. The camera apparatus of claim 11, wherein the prism actuator performs tilt correction on a high-angle hand-shake of the prism unit according to the prism driving signal.

15. The camera apparatus of claim 11, wherein the sensor actuator performs shift correction on a high-frequency hand-shake of the image sensor unit according to the sensor driving signal.

16. The camera apparatus of claim 11, wherein the driver circuit generates a prism driving signal for image stabilization of the prism unit or a sensor driving signal for image stabilization of the image sensor unit.

17. The camera apparatus of claim 11, wherein the driver circuit generates a prism driving signal for image stabilization of the prism unit and a sensor driving signal for image stabilization of the image sensor unit.

18. A multi-image stabilization method comprising:
receiving gyro sensor information from a gyro sensor detecting a hand-shake of a camera body portion;
determining a hand-shake of the camera body portion based on the gyro sensor information; and
a driving operation of performing lens shift correction on a lens assembly of the camera body portion or performing tilt correction on a prism unit of the camera body portion in an event of a high-angle hand-shake according to a hand-shake determination result, and performing sensor shift correction or rolling correction on an image sensor unit of the camera body portion in an event of a high-frequency hand-shake according to the hand-shake determination result,
wherein the prism unit folds an optical axis substantially ninety degrees, and
wherein
in the driving operation, according to the hand-shake determination result,
a lens driving signal having a first driving current for high-angle and low-frequency image stabilization is generated in an event of a high-angle hand-shake but not a high-frequency hand-shake,
a lens driving signal having a second driving current for high-angle and high-frequency image stabilization is generated in an event of a high-angle hand-shake and a high-frequency hand-shake,
a lens driving signal having a third driving current for low-angle and low-frequency image stabilization is generated in an event of not a high-angle hand-shake and not a high-frequency hand-shake, and
a sensor driving signal for low-angle and high-frequency image stabilization is generated in an event of a high-frequency hand-shake but not a high-angle hand-shake.

19. The multi-image stabilization method of claim 18, wherein, in the driving operation, in the event of the high-angle hand-shake according to the hand-shake determination result, a lens driving signal for high-angle image stabilization with respect to the lens assembly or a prism driving signal for high-angle image stabilization with respect to the prism unit is generated.

20. The multi-image stabilization method of claim 18, wherein, in the driving operation, in the event of the high-frequency hand-shake according to the hand-shake determination result, a sensor driving signal for sensor shift correction or rolling correction with respect to the image sensor unit is generated.

21. The multi-image stabilization method of claim 18, wherein,
in the driving operation, according to the hand-shake determination result,
sensor rolling driving is performed on the image sensor unit in an event of rolling but not a hand-shake,
lens shift driving is performed on the lens assembly and sensor rolling driving is performed on the image sensor unit in an event of rolling and a hand-shake,
lens shift driving is performed on the lens assembly in an event of not rolling and in an event of a hand-shake, and
correction is not performed in the event of not rolling nor hand-shake.

22. The multi-image stabilization method of claim 18, wherein,
in the driving operation, according to the hand-shake determination result,
sensor rolling correction is performed on the image sensor unit in an event of rolling but not a hand-shake, lens shift correction is performed on the lens assembly and sensor rolling correction is performed on the image sensor unit in an event of rolling and a hand-shake, sensor shift correction is performed on the image sensor unit in an event of high-frequency hand-shake but not a high-angle hand-shake in an event of not rolling, lens shift correction is performed on the lens assembly in an event of a high-angle hand-shake but not rolling, and correction is not performed in a case of not rolling nor hand-shake.

23. A camera apparatus comprising:

a multi-image stabilization device comprising:

- a driver circuit generating one or more of a sensor driving signal for image stabilization of an image sensor unit of a camera body portion and a lens driving signal for image stabilization of a lens assembly of a camera body portion or a prism driving signal for image stabilization of a prism unit of the camera body portion, based on gyro sensor information input from a gyro sensor detecting a hand-shake of the camera body portion;

the camera body portion comprising the lens assembly or the prism unit, and the image sensor unit;

the gyro sensor;

a lens actuator disposed in the camera body portion for driving the lens assembly and performing image stabilization on the lens assembly in response to the lens driving signal or a prism actuator disposed in the camera body portion for driving the prism unit and performing image stabilization on the prism unit in response to the prism driving signal; and a sensor actuator disposed in the camera body portion for driving the image sensor unit and performing image stabilization on the image sensor unit in response to the sensor driving signal, wherein the driver circuit generates the lens driving signal or the prism driving signal, having a first driving current for high-angle and low-frequency image stabilization in an event of a high-angle hand-shake but not a high-frequency hand-shake based on the gyro sensor information, the driver circuit generates the lens driving signal or the prism driving signal, having a second driving current for high-angle and high-frequency image stabilization in an event of a high-angle hand-shake and a high-frequency hand-shake, the driver circuit generates the lens driving signal or the prism driving signal, having a third driving current for low-angle and low-frequency image stabilization in an event of not a high-angle hand-shake and not a high-frequency hand-shake, and the driver circuit generates the sensor driving signal for low-angle and high-frequency image stabilization in an event of a high-frequency hand-shake but not a high-angle hand-shake.

24. The camera apparatus of claim 23, wherein the driver circuit generates the lens driving signal or the prism driving signal for high-angle image stabilization in an event of high-angle hand-shake, and generates a sensor driving signal for high-frequency image stabilization in an event of a high-frequency hand-shake, based on the gyro sensor information.

25. The camera apparatus of claim 23, wherein the driver circuit generates the lens driving signal or the prism driving signal for high-angle image stabilization in an event of a high-angle hand-shake and generates a sensor driving signal for rolling correction in an event of rolling, based on the gyro sensor information.

26. The camera apparatus of claim 23, wherein the lens actuator performs shift correction on a high-angle hand-shake of the lens assembly according to the lens driving signal or the prism actuator performs tilt correction on a high-angle hand-shake of the prism unit according to the prism driving signal.

27. The camera apparatus of claim 23, wherein the sensor actuator performs shift correction on a high-frequency hand-shake of the image sensor unit according to the sensor driving signal.

28. The camera apparatus of claim 23, wherein the driver circuit generates the lens driving signal for image stabilization of the lens assembly or the prism driving signal for image stabilization of the prism unit, or the sensor driving signal for image stabilization of the image sensor unit.

* * * * *